United States Patent
Funaki et al.

(10) Patent No.: US 9,409,499 B2
(45) Date of Patent: Aug. 9, 2016

(54) CONVEYANCE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Shohei Funaki, Miyoshi (JP); Michiaki Kojima, Toyota (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/602,536

(22) Filed: Jan. 22, 2015

(65) Prior Publication Data
US 2015/0210189 A1 Jul. 30, 2015

(30) Foreign Application Priority Data
Jan. 27, 2014 (JP) ................................. 2014-012253

(51) Int. Cl.
*B60N 2/30* (2006.01)
*A47D 1/10* (2006.01)
(Continued)

(52) U.S. Cl.
CPC ............... *B60N 2/28* (2013.01); *B60N 2/2887* (2013.01); *B60N 2/2893* (2013.01); *B60N 2/449* (2013.01); *B60N 2/58* (2013.01); *B60N 2/64* (2013.01); *B60N 2/70* (2013.01)

(58) Field of Classification Search
CPC .............. B60N 2/28; B60N 2/58; B60N 2/64; B60N 2/449; B60N 2/2887; B60N 2/2893; B60N 2/70

USPC .......... 297/218.1, 218.2, 218.3, 218.4, 218.5, 297/253, 452.27
See application file for complete search history.

(56) References Cited

U.S. PATENT DOCUMENTS

| 5,944,389 A * | 8/1999 | Zenba ..................... B60N 2/70 297/452.48 X |
| 6,082,819 A * | 7/2000 | Jackson ............... B60N 2/2821 297/253 X |

(Continued)

FOREIGN PATENT DOCUMENTS

| DE | 10128593 | 12/2002 |
| DE | 102005013613 | 9/2006 |

(Continued)

OTHER PUBLICATIONS

Extended European Search Report for EP 15151877.6 having a mailing date of May 28, 2015.

(Continued)

*Primary Examiner* — Rodney B White
(74) *Attorney, Agent, or Firm* — Greenblum & Bernstein, P.L.C.

(57) ABSTRACT

In a conveyance seat, a columnar engaging portion protruding from a rear surface of an additional member is moved toward a seat back while being in contact with a seat cushion, and the engaging portion is inserted between the seat cushion and the seat back, and is engaged with an engaged portion disposed between the seat cushion and the seat back. The seat pad includes a general portion that elastically supports an occupant, and a compression portion that is compressed more easily than the general portion. The compression portion contacts and supports the seat cover, and is disposed on a movement path of the engaging portion such that the engaging portion is moved toward the engaged portion and is engaged with the engaged portion while compressing the compression portion.

10 Claims, 5 Drawing Sheets

(51) Int. Cl.
*A47C 31/02* (2006.01)
*A47C 7/24* (2006.01)
*B60N 2/28* (2006.01)
*B60N 2/70* (2006.01)
*B60N 2/44* (2006.01)
*B60N 2/58* (2006.01)
*B60N 2/64* (2006.01)

(56) References Cited

U.S. PATENT DOCUMENTS

| | | | | |
|---|---|---|---|---|
| 6,322,141 | B1 * | 11/2001 | Dutkievic | B60N 2/2893 297/218.1 X |
| 6,416,128 | B1 * | 7/2002 | Fujii | B60N 2/2893 297/218.1 |
| 6,582,016 | B1 * | 6/2003 | Kirchoff | B60N 2/286 297/253 |
| 6,672,671 | B1 * | 1/2004 | Stoschek | B29C 44/1276 297/452.48 |
| 7,334,278 | B2 * | 2/2008 | Yamasaki | B29C 39/12 297/452.27 X |
| 7,533,934 | B2 * | 5/2009 | Foelster | B60N 2/2893 297/253 |
| 7,699,396 | B2 * | 4/2010 | Ghisoni | B60N 2/58 297/253 X |
| 8,328,280 | B2 * | 12/2012 | Parker | B60N 2/2887 297/253 X |
| 9,038,252 | B2 * | 5/2015 | Ali et al. | B68G 7/00 297/452.27 X |
| 9,167,901 | B2 * | 10/2015 | Suenaga | A47C 7/24 |
| 2002/0017733 | A1 * | 2/2002 | Kobayashi | B29C 44/0469 264/45.4 |
| 2002/0043839 | A1 * | 4/2002 | Hirota | B60N 2/2827 297/253 |
| 2007/0080568 | A1 * | 4/2007 | Nakagawa | B60N 2/2809 297/253 |
| 2007/0176476 | A1 * | 8/2007 | Weber | B60N 2/2893 297/253 |
| 2008/0012403 | A1 | 1/2008 | Foelster et al. | |
| 2008/0136150 | A1 * | 6/2008 | Shin | B60R 21/01556 297/253 X |
| 2009/0146472 | A1 | 6/2009 | Galbreath et al. | |
| 2012/0049590 | A1 | 3/2012 | Parker | |

FOREIGN PATENT DOCUMENTS

| | | |
|---|---|---|
| DE | 102008060993 | 6/2009 |
| JP | 2001-30811 | 2/2001 |
| JP | 2001-260731 | 9/2001 |
| JP | 2001246973 | 9/2001 |
| JP | 3512356 | 1/2004 |
| JP | 2012-201285 | 10/2012 |

OTHER PUBLICATIONS

Official Action, including a partial English-language translation thereof, for JP App. No. 2014-012253 having an issuance date of Jan. 5, 2016.

* cited by examiner

CONVEYANCE SEAT

INCORPORATION BY REFERENCE

The disclosure of Japanese Patent Application No. 2014-012253 filed on Jan. 27, 2014 including the specification, drawings and abstract is incorporated herein by reference in its entirety.

BACKGROUND OF THE INVENTION

1. Field of the Invention

The invention relates to a conveyance seat on which an additional member, such as a child safety seat, is able to be installed.

2. Description of Related Art

As this kind of conveyance seat, a conveyance seat, on which a child safety seat is able to be installed, is known (refer to Japanese Patent No. 3512356). The child safety seat is a small-sized seat body that is able to be installed on a seating-side of the conveyance seat. The child safety seat includes columnar attachment members (engaging portions) that protrude from a rear portion of the child safety seat. The conveyance seat includes a seat cushion, and a seat back that stands behind the seat cushion. The seat cushion includes a seat pad that forms the outer shape of the seat cushion and elastically supports an occupant, and a seat cover that covers a seating surface of the seat pad.

In the related art, a recessed portion is provided in a rear side of the seat cushion, and anchors (engaged portions), with which the attachment members are able to be engaged, are disposed inside the recessed portion. The recessed portion is formed by pressure-bonding a seat cover to a groove in a rear end portion of the seat pad (directly under the seat back). When a child safety seat is installed on the seating side of the conveyance seat, the attachment members are moved toward the seat back while being in contact with the seat cushion. Subsequently, the attachment members are moved into the recessed portion, inserted between the seat cushion and the seat back, and engaged with the anchors. Thus, in the related art, since the recessed portion (i.e., an appropriate space) is provided, the attachment members are easily inserted between the seat cushion and the seat back, and therefore, the child safety seat is smoothly installed in the conveyance seat.

In the related art, the recessed portion is provided in the seat cushion, that is, the seat cushion is partly recessed. Therefore, in view of, for example, the design (appearance) of the seat, the configuration according to the related art cannot be readily employed. Further, since the recessed portion is formed by pressure-bonding the seat cover to the groove provided by recessing a part of the seat pad, the efficiency of an operation of fitting the seat cover is slightly low. On the other hand, it is conceivable to employ the configuration in which the seat cover covers the recessed portion without being pressure-bonded, that is, the seat cover is provided in a manner similar to the manner in which a tent is provided. In this case, however, a gap may be formed between the recessed portion and a portion of the seat cover that covers the recessed portion, and accordingly, creases, sags, or impressions (i.e., impressions caused when the attachment members are inserted) may occur. Thus, with this configuration, design (appearance) is likely to be poor.

SUMMARY OF THE INVENTION

The invention provides a conveyance seat in which degradation of seat performance is avoided as much as possible, and an additional member, such as a child safety seat, is able to be smoothly installed.

A conveyance seat according to a first aspect of the invention includes a seat cushion, and a seat back that is connected to the seat cushion such that the seat back is tiltable. The seat cushion includes a seat pad that forms a seat outer shape, and a seat cover that covers a seating surface of the seat pad. In the first aspect of the invention, an additional member is installed on a seating side of the seat cushion. At this time, an engaging portion that is columnar and protrudes from a rear surface of the additional member is moved toward the seat back while being in contact with the seat cushion, and the engaging portion is inserted between the seat cushion and the seat back, and is engaged with an engaged portion disposed between the seat cushion and the seat back. In this kind of configuration, it is preferable that degradation of seat performance (for example, design (appearance)) be avoided as much as possible, and the additional member, such as a child safety seat, be smoothly installed.

Thus, in the aspect of the invention, the seat pad includes a general portion that elastically supports an occupant, and a compression portion that is compressed more easily than the general portion. The compression portion contacts and supports the seat cover, and is disposed on a movement path of the engaging portion such that the engaging portion is moved toward the engaged portion and is engaged with the engaged portion while compressing the compression portion. In the aspect of the invention, the compression portion (a part of the compression portion or the entire compression portion) supports a portion of the seat cover, which covers the compression portion (a gap is unlikely to be formed between the compression portion and the seat cover). Therefore, it is possible to avoid occurrence of a crease and an impression in the portion of the seat cover. In addition, the engaging portion is moved toward the engaged portion, and is smoothly engaged with the engaged portion while compressing the compression portion (i.e., the portion that is compressed relatively easily). Thus, it is possible to smoothly install the additional member.

In the conveyance seat according to the aspect of the invention, the additional member may be a child safety seat.

In the conveyance seat according to the aspect of the invention, the compression portion may be separated from the general portion by a slit portion that is a groove extending along the movement path of the engaging portion; and the compression portion may be compressed while being expanded toward the slit portion. Thus, according to the aspect of the invention, with the slit portion (i.e., the relatively simple configuration), it is possible to smoothly compress the compression portion. Accordingly, with the relatively simple configuration, it is possible to smoothly install the additional member.

In the conveyance seat according to the aspect of the invention, a pair of the slit portions may be provided, and the compression portion may be provided between the pair of the slit portions such that the compression portion is separated from the general portion. According to the aspect of the invention, the compression portion is compressed while being expanded toward the pair of the slit portions (thus, it is possible to compress the compression portion more smoothly). Accordingly, it is possible to install the additional member more smoothly.

In the conveyance seat according to the aspect of the invention, a cord member may be disposed in at least one of the pair of the slit portions. According to the aspect of the invention, the slit portions promote the compression of the compression portion, and at least one of the slit portions is used as the portion in which the cord member is disposed (that is, at least one of the slit portions is used for multi-purposes). Accordingly, it is possible to smoothly install the additional member, while using at least one of the slit portions for multi-purposes.

In the conveyance seat according to the aspect of the invention, the cord member may be a wire member.

In the conveyance seat according to the aspect of the invention, the slit portion may be open from a seating surface of the seat cushion to an end face of the seat cushion, the end face being on a side on which the seat back is disposed. According to the aspect of the invention, it is possible to compress the compression portion more appropriately using the slit portion that is disposed at an appropriate location. Accordingly, it is possible to install the additional member more smoothly.

In the conveyance seat according to the aspect of the invention, a bottom surface of one of the pair of the slit portions may be tilted, and a depth of the one of the pair of the slit portions increases in a direction from a seat front side toward a seat rear side.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
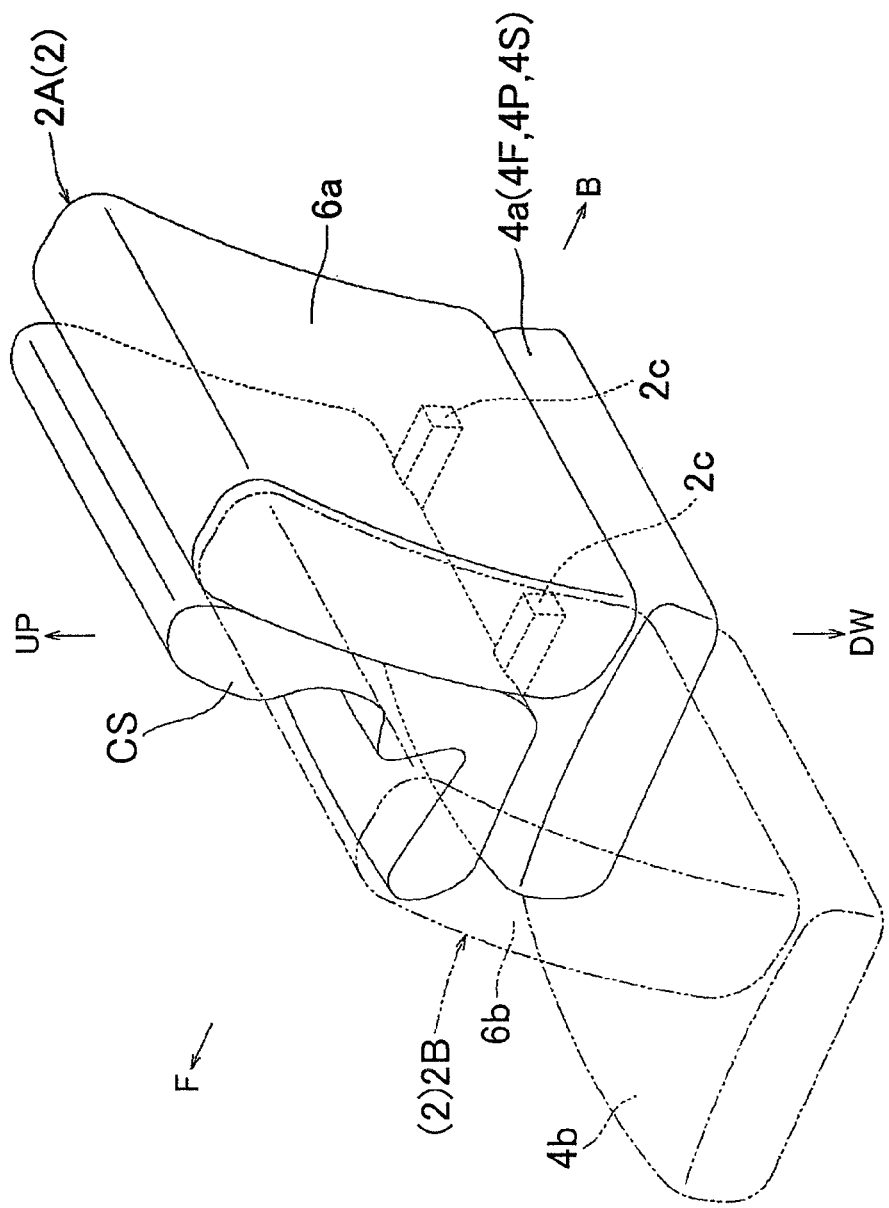
FIG. 1 is a partially transparent perspective view showing a conveyance seat on which a child safety seat is installed.

Hereinafter, an embodiment of the invention will be described with reference to FIG. 1 to FIG. 6. In each figure, a reference sign F indicates a forward direction with respect to a conveyance seat, a reference sign B indicates a rearward direction with respect to the conveyance seat, a reference sign UP indicates an upward direction with respect to the conveyance seat, and a reference sign DW indicates a downward direction with respect to the conveyance seat. A conveyance seat 2 shown in FIG. 1 is a seat having a large width in which a plurality of occupants can be seated. The conveyance seat 2 includes a first seat portion 2A, and a second seat portion 2B. The first seat portion 2A includes seat constituent members (a seat cushion 4a, and a seat back 6a). The second seat portion 2B includes seat constituent members (a seat cushion 4b, and a seat back 6b). The second seat portion 2B is disposed adjacent to the first seat portion 2A. Each of the seat constituent members includes a seat frame that forms a frame of the seat, a seat pad that forms a seat outer shape and elastically supports an occupant, and a seat cover that covers the seat pad. In the embodiment, seat cushions 4a, 4b are connected to each other, and the seat cushion 4a includes a seat pad 4P that is elongated in a seat width direction, and a seat cover 4S that covers the seat pad 4P (refer to FIG. 2 and FIGS. 3A and 3B. Each member will be described in detail later). A pair of seat backs 6a, 6b is provided, and the seat backs 6a, 6b are respectively connected to rear portions of the corresponding seat cushions 4a, 4b such that the seat backs 6a, 6b are tiltable.

In the embodiment, for example, a child safety seat CS (an example of an additional member) is able to be disposed in the first seat portion 2A (refer to FIG. 1). The child safety seat CS is a small-sized seat body that is able to be disposed on a seating side of the first seat portion 2A. The child safety seat CS includes a pair of engaging portions 2c protruding from the rear surface of the child safety seat CS. Each of the engaging portions 2c is a columnar member. A recessed portion is provided at a distal end of each of the engaging portions 2c, and an engaged portion 8 (described later) is engaged with the recessed portion. The engaging portions 2c protrude from lower portions in both sides of (the rear surface of) the child safety seat CS in a width direction thereof, toward a seat rear side (refer to FIG. 1 and FIG. 5). The pair of the engaged portions 8 is provided in the first seat portion 2A (more specifically, the engaged portions 8 are respectively provided in both sides of the first seat portion 2A in the seat width direction), and the engaged portions 8 are disposed between the seat cushion 4a and the seat back 6a (refer to FIG. 1 and FIG. 2). Each of the engaged portions 8 is a columnar member that has a substantially U-shape, and is fixed to a bracket 9 (that is a columnar member extending in the seat width direction). In the embodiment, each engaged portion 8 (more specifically, a connected side of the engaged portion 8) is disposed close to the seat cushion 4a such that the corresponding engaging portion 2c is engaged with the engaged portion 8 (refer to FIG. 4 and FIG. 5).

Figure 2:
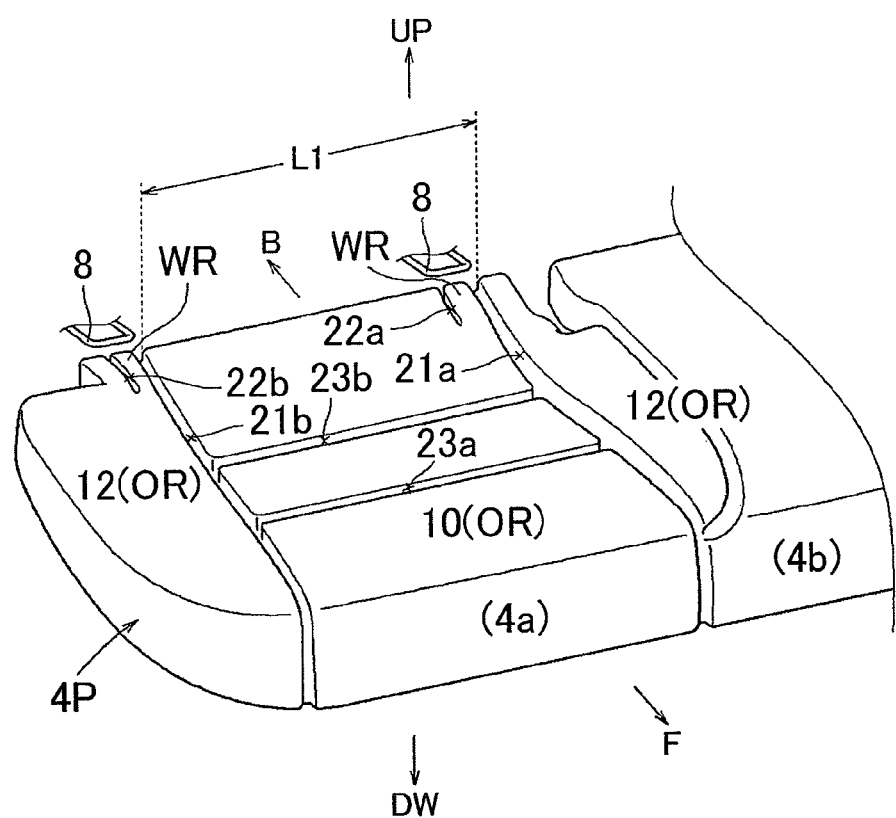
FIG. 2 is a perspective view showing a part of a seat pad and engaged portions.

In the embodiment, the child safety seat CS is disposed on the seating side of the first seat portion 2A, and the engaging portions 2c are engaged with the corresponding engaged portions 8 (refer to FIG. 1 and FIG. 2). At this time, each of the engaging portions 2c is moved from the seat front side toward the seat rear side while being in contact with the seat cushion 4a (more specifically, the seating side of the seat cushion 4a), and the engaging portion 2c is inserted between the seat cushion 4a and the seat back 6a, and is engaged with the corresponding engaged portion 8 (refer to FIG. 1, FIGS. 3A and 3B, and FIG. 5), as described later. In this kind of configuration, it is preferable that degradation of seat performance be avoided as much as possible (for example, occurrence of a crease and an impression in the seat cover 4S be prevented as much as possible) and the child safety seat CS be smoothly installed. Thus, in the embodiment, the configuration described later is provided so as to avoid the degradation of the seat performance as much as possible, and to smoothly install the child safety seat CS. Each portion of the configuration will be described in detail.

Seat Cushion

In the seat cushion 4a in the embodiment, the seat pad 4P is disposed on a seat frame 4F (not shown), and is covered with the seat cover 4S (refer to FIG. 1). The seat frame 4F is a frame body that has a substantially rectangular shape (in a top view). The seat frame 4F is formed of a material having high rigidity, such as metal. The seat cover 4S is a surface material having a bag shape, which is able to cover the seat pad 4P (described in detail later). For example, the seat cover 4S is formed of a fabric (a woven fabric, a knitted fabric, or a non-woven fabric), or a leather (a natural leather or an artificial leather) (refer to FIGS. 3A and 3B). Portions of the seat cover 4S are drawn into recessed portions of the seat pad 4P (for example, first slit portions 21a, 21b) (refer to FIG. 3B) and fixed, as described later. In the embodiment, a cloth material 4Sa having an annular shape is fitted to, for example, a drawn portion of the seat cover 4S (i.e., a portion of the seat cover 4S, which covers a location between a main portion 10 and a side portion 12 described later). A first wire 31 is disposed inside the cloth material 4Sa, and is disposed, for example, in each of first slit portions 21a, 21b (described later) such that the first wire 31 faces a second wire 32.

Seat Pad (General Portion)

The seat pad 4P is a member having a substantially rectangular shape in a top view, and the seat pad 4P is formed of a foamed resin. The seat pad 4P includes the main portion 10, the pair of the side portions 12, and constituent portions described later (for example, the plurality of slit portions 21a, 21b, 22a, 22b, and compression portions WR) (refer to FIG. 2 and FIGS. 3A and 3B). For example, polyurethane foam (density: 10 kg/m$^3$ to 60 kg/m$^3$) may be used as a material of which the seat pad 4P is formed. The main portion 10 is a flat portion on which the occupant is able to be seated, and may be provided in the center of the seat cushion 4a. The side portions 12 are recessed portions provided in both sides of the seat cushion 4a in the seat width direction. Each of the side portions 12 supports a side portion of the occupant, for example, when a vehicle is cornering. In the embodiment, the main portion 10 and the side portions 12 excluding the slit portions and the compression portions WR (described later) form a general portion OR that is able to elastically support the occupant. The main portion 10 and the side portions 12 are covered with the seat cover 4S (described later) A width L1 (a length between the first slit portions 21a, 21b described later) of the main portion 10 that forms the general portion OR is not limited to a specific width, as long as buttocks of the occupant are able to be disposed on the main portion 10.

Slit Portions

Each of the plurality of slit portions (for example, the first slit portions 21a, 21b, the second slit portions 22a, 22b) is a recessed portion (i.e., a groove) in the seating side of the seat pad 4P (refer to FIG. 2). Each of the first slit portions 21a, 21b is a recessed portion (that is relatively long, i.e., longer than each of the second slit portions 22a, 22b) extending in a seat front-rear direction. Each of the first slit portions 21a, 21b is provided between the main portion 10 and the side portion 12. Each of the first slit portions 21a, 21b extends along a path on which the engaging portion 2c is moved (hereinafter, referred to as "a movement path of the engaging portion 2c"). Each of the first slit portions 21a, 21b is continuously open from a seating surface of the seat cushion 4a to a rear surface of the seat cushion 4a (i.e., an end face on the seat back-side, in other words, an end face on the side on which the seat back is disposed (an end face close to the seat back)). In the embodiment, the second wire 32 is embedded in each of the first slit portions 21a, 21b, and a portion of each second wire 32 is appropriately exposed to a bottom surface side of the corresponding slit portion 21a or 21b (refer to FIG. 2 and FIG. 3B).

Each of the second slit portions 22a, 22b is a recessed portion (that is relatively short, i.e, shorter than each of the first slit portions 21a, 21b) extending in the seat front-rear direction. Each of the second slit portions 22a, 22b is provided to extend from an intermediate portion of the seat pad 4P to the rear surface of the seat pad 4P (refer to FIG. 2). In the embodiment, each of the second slit portions 22a, 22b extends along the movement path of the engaging portion 2c. Each of the second slit portions 22a, 22b is continuously open from the seating surface of the seat pad 4P to the rear surface of the seat pad 4P (refer to FIG. 2 and FIG. 4). A depth of each of the second slit portions 22a, 22b gradually increases in a direction from the seat front side to the seat rear side (in other words, the bottom surface of each of the second slit portions 22a, 22b is tilted). A rear end portion (i.e., a deepest portion) of each of the second slit portions 22a, 22b is located below a position at which the corresponding engaged portion 8 is disposed. In the embodiment, the depth of each of the second slit portions 22a, 22b is set to be smaller (shallower) than the depth of each of the first slit portions 21a, 21b (refer to FIG. 3A).

Figure 3A:
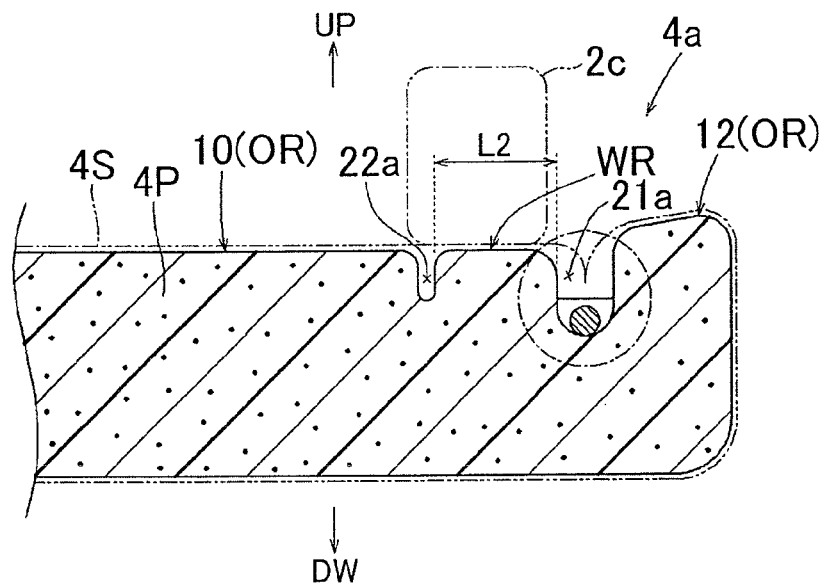
FIG. 3A is a sectional view taken along a seat width direction, FIG. 3A showing a part of a seat cushion.

In the embodiment, the first slit portion 21a (or 21b) and the second slit portion 22a (or 22b) are disposed on respective sides of the movement path of the engaging portion 2c such that the first slit portion 21a (or 21b) and the second slit portion 22a (or 22b) are substantially parallel to each other (refer to FIG. 2 and FIG. 3A). In this case, the first slit portion 21a (i.e., one of the first slit portions) and the second slit portion 22a (i.e., one of the second slit portions) are provided in an inner side of the seat cushion 4a (i.e., a side close to the seat cushion 4b). The second slit portion 22a is provided inside the first slit portion 21a (i.e., the second slit portion 22a is provided in the main portion 10). Accordingly, a clearance (i.e., an area), through which the engaging portion 2c is able to pass, is provided between the first slit portion 21a and the second slit portion 22a in the seat width direction, and thus, the compression portion WR is provided. The first slit portion 21b (i.e., the other of the first slit portions) and the second slit portion 22b (i.e., the other of the second slit portions) are provided in an outer side of the seat cushion 4a. The second slit portion 22b is provided outside the slit portion 21b (i.e., the second slit portion 22b is provided in the side portion 12). Accordingly, a clearance (i.e., an area), through which the engaging portion 2c is able to pass, is provided between the first slit portion 21b and the second slit portion 22b in the seat width direction, and thus, the compression portion WR is provided. In the embodiment, third slit portions 23a, 23b (i.e., recessed portions) extending in the seat width direction may be provided in the seat pad 4P, and both ends of each of the third slit portions 23a, 23b may respectively communicate with the first slit portions 21a, 21b (refer to FIG. 2). A wire member (not shown) may be embedded in each of the third slit portions 23a, 23b, and a portion of the seat cover 4S may be fixed in each of the third slit portions 23a, 23b as in each of the first slit portions 21a, 21b.

Compression Portion

The compression portions WR are portions that are compressed (deformed) more easily than the general portion OR (for example, the main portion 10). The compression portions WR are provided on the movement paths of the engaging portions 2c (refer to FIG. 2 to FIG. 4). In the embodiment, each of the compression portions WR is a portion of the seat pad 4P, which is disposed between the first slit portion 21a (or 21b) and the second slit portion 22a (or 22b) (refer to FIG. 2). In the embodiment, each of the compression portions WR is provided to extend in the seat front-rear direction (on the movement path of the engaging portion 2c), from an intermediate portion of the seat cushion 4a to the rear end of the seat cushion 4a (refer to FIG. 4 and FIG. 5). The seating surface (i.e., the top surface) of each compression portion WR is substantially continuous with the seating surfaces of the main portion 10 and the like that form the general portion OR such that the slit portions are disposed between the seating surface of the compression portion WR and the seating surfaces of the main portion 10 and the like that form the general portion OR. Therefore, in the embodiment, a portion of the seat cover 4S, which covers the (entire) seating surface of the compression portion WR, is able to be supported by the seating surface of the compression portion WR.

Each of the compression portions WR has a width L2 that is set in accordance with the width of the engaging portion 2c (i.e., the length of the engaging portion 2c in the seat width direction). The width L2 of the compression portion WR is smaller than the width L1 of the main portion 10 (refer to FIG. 2 and FIG. 3A). The compression portion WR is compressed while being expanded toward the first slit portion 21a (or 21b) and the second slit portion 22a (or 22b), and thus, the compression portion WR is elastically compressed (deformed) more easily than the general portion OR (i.e., the main portion 10 and the like). Further, in the embodiment, each of the second slit portions 22a, 22b is provided such that the depth of each of the second slit portions 22a, 22b gradually increases from the intermediate portion of the seat cushion 4a toward the rear end of the seat cushion 4a. Thus, each of the compression portions WR is configured such that an amount, by which the compression portion WR is able to be compressed, gradually increases toward the rear portion of the seat cushion 4a (i.e., toward the engaged portion 8). Accordingly, it is possible to smoothly guide each of the engaging portions 2c to the corresponding engaged portion 8. The amount, by which the compression portion WR is able to be compressed, is not limited, as long as the engaging portion 2c is able to be engaged with the engaged portion 8 (refer to FIG. 5).

Operation of Forming the Seat Cushion

Figure 3B:
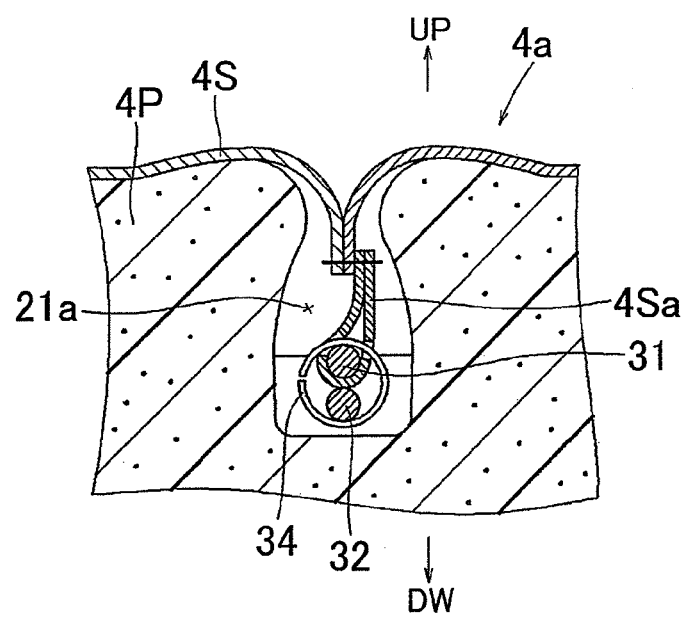
FIG. 3B is a sectional view taken along the seat width direction, FIG. 3B showing an enlarged part of the seat cushion, in which one slit portion is provided.
Figure 4:
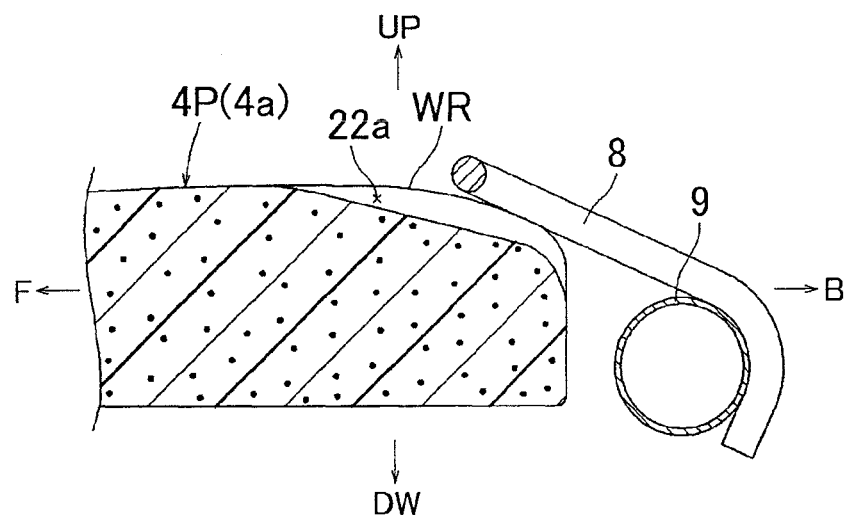
FIG. 4 is a sectional view taken along a seat front-rear direction, FIG. 4 showing a part of the conveyance seat.
Figure 5:
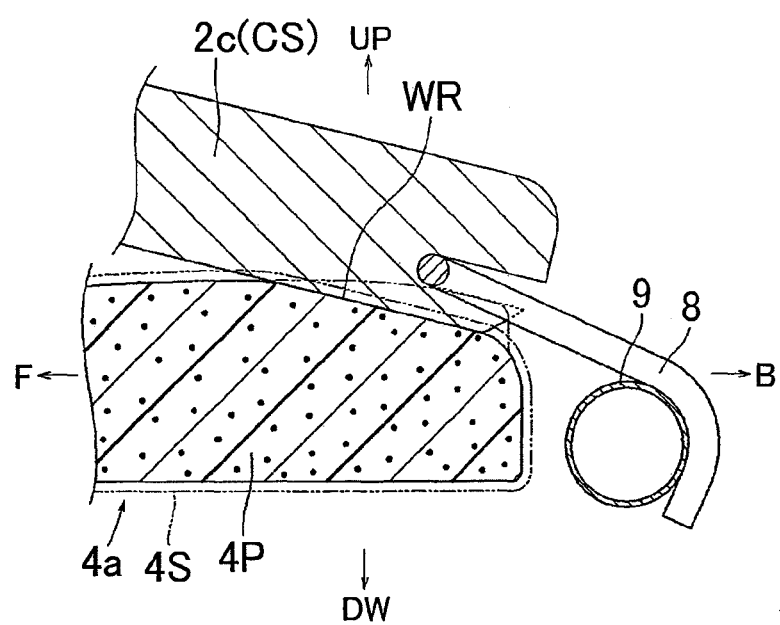
FIG. 5 is a sectional view taken along the seat front-rear direction, FIG. 5 showing a part of the conveyance seat.
Figure 6A:
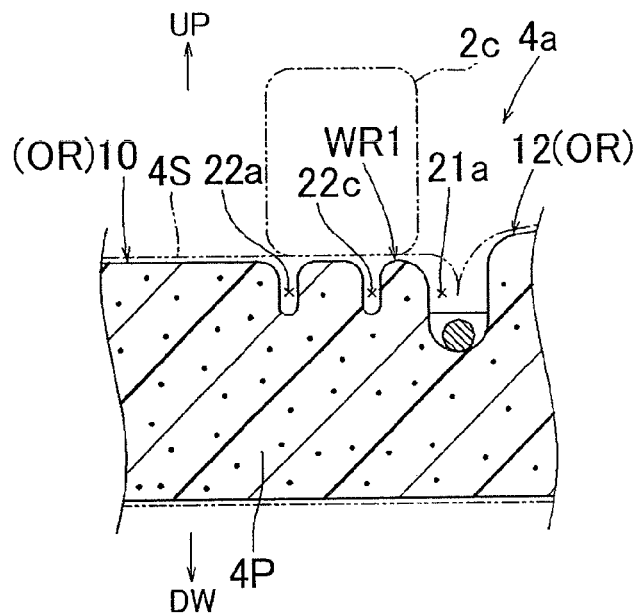
FIG. 6A is a sectional view taken along the seat width direction, FIG. 6A showing a part of a seat cushion according to a first modified example.
Figure 6B:
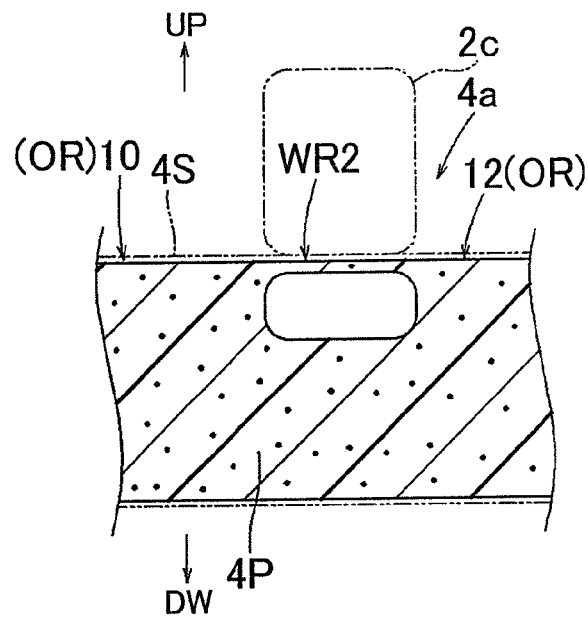
FIG. 6B is a sectional view taken along the seat width direction, FIG. 6B showing a part of a seat cushion according to a second modified example.

Referring to FIG. 3, after the seat pad 4P is disposed on the seat frame 4F (not shown), the seat pad 4P is covered with the seat cover 4S. At this time, in the embodiment, the seating side of each of the compression portions WR supports the seat cover 4S, by contacting the reverse surface of the seat cover 4S. Thus, a gap is unlikely to be formed between the compression portion WR and the seat cover 4S (refer to FIG. 3). Accordingly, in the embodiment, the seating side of each of the compression portions WR is able to be covered with the seat cover 4S such that the compression portion WR is in the same state as the state of the general portion OR (the main portion 10, and the side portions 12). Thus, with this configuration, excellent design (appearance) is provided, and it is possible to avoid occurrence of a crease, an impression, and the like as much as possible. When the above-described operation is performed, the drawn portion of the seat cover 4S is drawn into the first slit portion 21a (or 21b) together with the first wire 31, and is disposed such that the drawn portion of the seat cover 4S and the first wire 31 face the second wire 32 in the first slit portion 21a (or 21b) (refer to FIG. 3B). Then, after both the wires 31, 32 are hooked in a ring member 34 (having a substantially C-shape), the ring member 34 is closed (to have a substantially O-shape) using a tool or the like. Thus, the portion of the seat cover 4S is drawn into the first slit portion 21a (or 21b) and fixed (i.e., the portion of the seat cover 4S is fixed using a hook ring).

Operation of Installing the Child Safety Seat (The Additional Member)

Referring to FIG. 1, FIGS. 3A and 3B, and FIG. 5, the child safety seat CS is disposed on the seating side of the first seat portion 2A, and the engaging portions 2c are respectively engaged with the corresponding engaged portions 8. In the embodiment, each of the engaging portions 2c is moved from the seat front side toward the seat rear side (i.e., toward the seat back 6a) while being in contact with the seat cushion 4a, and each of the engaging portions 2c is inserted between the seat cushion 4a and the seat back 6a. At this time, in the embodiment, the compression portions WR (i.e., portions that are compressed relatively easily) are provided on the movement paths of the respective engaging portions 2c. Accordingly, when the child safety seat CS is installed, each of the engaging portions 2c is moved toward the corresponding engaged portion 8 and is engaged with the corresponding engaged portion 8 while compressing the corresponding compression portion WR. Thus, since an appropriate clearance is formed between the seat cushion 4a and the seat back 6a by compressing each of the compression portions WR, it is possible to smoothly guide each of the engaging portions 2c to the corresponding engaged portion 8. Further, in the embodiment, each of the compression portions WR is compressed while being expanded toward the first slit portion 21a (or 21b) and the second slit portion 22a (or 22b). In addition, the amount, by which the compression portion WR is compressed, gradually increases toward the engaged portion 8 (refer to FIG. 4 and FIG. 5). Accordingly, it is possible to guide each of the engaging portions 2c to the corresponding engaged portion 8 more smoothly while appropriately compressing the corresponding compression portion WR.

As described above, in the embodiment, the seating side of each of the compression portions WR supports the seat cover 4S (i.e., a gap is unlikely to be formed between the compression portion WR and the seat cover 4S). Therefore, it is possible to avoid occurrence of a crease and an impression as much as possible. Thus, it is possible to smoothly engage each of the engaging portions 2c with the corresponding engaged portion 8 while compressing the corresponding compression portion WR (i.e., the portion that is compressed relatively easily). In the invention, by using the first slit portions 21a, 21b, and the second slit portions 22a, 22b (i.e., by using the relatively simple configuration), it is possible to smoothly compress the compression portions WR. In this case, the first slit portions 21a, 21b can be used as the portions in which the second wires 32 (cord members) are disposed (i.e., the first slit portions 21a, 21b can be used for another purpose). In the embodiment, each of the slit portions 21a, 21b, 22a, 22b is open from the seating surface of the seat cushion 4a to the rear surface of the seat cushion 4a (i.e., each of the slit portions 21a, 21b, 22a, 22b is appropriately disposed). Thus, it is possible to compress the compression portions WR more appropriately. Thus, in the embodiment, it is possible to smoothly install the child safety seat CS while avoiding degradation of the seat performance (design (appearance) and the like) as much as possible.

First Modified Example

The compression portion may have various configurations, in addition to the above-described configuration. For example, in a first modified example, a compression portion WR1 is provided between the first slit portion 21a and the second slit portion 22a (refer to FIG. 6A). Further, an additional second slit portion 22c extending in the seat front-rear direction is provided at a substantially center of the compression portion WR1 (that is, the compression portion WR1 is divided into two parts). In the first modified example, a portion of the seating side of the compression portion WR1 (i.e., a portion of the compression portion WR1 excluding the additional second slit portion 22c) supports the seat cover 4S, by contacting the reverse surface of the seat cover 4S in the same manner as the manner in which the general portion OR supports the seat cover 4S. Accordingly, in the first modified example as well, the seating side of the compression portion WR1 is able to be covered with the seat cover 4S such that the compression portion WR1 is in the same state as the state of the general portion OR. Thus, with this configuration, excellent design (appearance) is provided. In the first modified example as well, each of the engaging portions 2c is engaged with the corresponding engaged portion (not shown) while compressing the compression portion WR1. At this time, the compression portion WR1 is compressed while being expanded toward the first slit portion 21a, the second slit portion 22a, and the additional second slit portion 22c. Thus, this configuration makes it possible to compress the compression portion WR1 more appropriately.

Second Modified Example

In the second modified example, a compression portion WR2 is provided by providing a hollow in the seat pad 4P. The compression portion WR2 is compressed more easily than the general portion OR (refer to FIG. 6B). In the second modified example, the seating side of the compression portion WR2 is directly connected to the general portion OR (the main portion 10 and the like), and appropriately supports the seat cover 4S, by contacting the reverse surface of the seat cover 4S. Thus, with this configuration, excellent design (appearance) is provided.

The conveyance seat according to the invention is not limited to the above-described embodiment, and may be implemented in various embodiments. (1) In the embodiment, the configuration of the compression portion WR (for example, the shape and size of the compression portion WR, the position at which the compression portion WR is provided, and the number of the compression portions WR) is exemplified. However, the configuration of the compression portion may be appropriately changed in accordance with the configuration of the engaging portion. For example, the position at which the compression portion WR is provided may be appropriately changed. The compression portion WR may be provided in at least one of the main portion and the side portion. In the embodiment, an example, in which the general portion and the compression portion of the seat pad are formed of the same material, is described. However, the compression portion may be formed of a material that is softer than the material of which the general portion is formed. In this case, the general portion and the compression portion may be formed by two-color molding. Further, the general portion and the compression portion may be separately formed, and then, the general portion and the compression portion may be combined with each other. In the first modified example, an example, in which the compression portion is divided into two parts, is described. However, the compression portion may be divided into three or more parts, by providing a plurality of second slit portions. In the second modified example, a plurality of space portions may be provided inside the seat pad.

(2) In the embodiment, an example, in which the compression portion WR is provided between the first slit portion 21a (or 21b) and the second slit portion 22a (or 22b), is described. However, the compression portion may have various configurations, as long as the compression portion is compressed more easily than the general portion. For example, the compression portion may be separated from the general portion, for example, by a single slit portion. Further, the cord member may be disposed in each of the first slit portion and the second slit portion. The cord member may not be disposed in the first slit portion, and may not be disposed in the second slit portion either. Examples of the cord member include various wire harnesses (wires) and various cables (for example, an optical cable). (3) In the embodiment, an example, in which the depth of each of the second slit portions 22a, 22b gradually increases from the intermediate portion of the seat cushion 4a toward the rear end of the seat cushion 4a, is described. However, the bottom surface of each second slit portion may have various shapes, that is, the bottom surface of each second slit portion may be substantially flat, curved, or stepped, instead of being tilted. Further, the depths of the second slit portions may be substantially the same, or the depth of one of the second slit portions may be larger than that of the other of the second slit portions. Each of the first slit portion and the second slit portion may be open at only the seating side of the seat cushion.

(4) In the embodiment, the configuration of each of the engaging portion 2c and the engaged portion 8 (for example, the shape and size of each of the engaging portion 2c and the engaged portion 8, the position at which each of the engaging portion 2c and the engaged portion 8 is provided, and the number of the engaging portions 2c and the number of the engaged portions 8) is exemplified. However, the configuration of each portion is not limited, and various engagement structures may be employed as long as, for example, the engaging portion and the engaged portion are able to be engaged with each other. One engaging portion, or three or more engaging portions may be provided, for example, at a center portion and/or side portion(s) of the child safety seat (i.e., the additional member). The number of the engaged portions (compression portions) and the position at which each engaged portion (each compression portion) is disposed may be appropriately changed in accordance with the configuration of each engaging portion. (5) In the embodiment, the child safety seat CS is exemplified as the additional member. However, various members that are able to be disposed on the seating side of the conveyance seat may be employed as the additional member. Further, the engaging portion may have various columnar shapes, that is, the engaging portion may have, for example, a polygonal columnar shape and a circular columnar shape, in addition to a rectangular columnar shape. (6) In the embodiment, the configuration is applied to the first seat portion. However, the configuration according to the embodiment may be applied to at least one of the first seat portion and the second seat portion. The conveyance seat may be a seat for one person, and the configuration of the seat cushion and the configuration of the seat back may be appropriately changed. The configuration according to the embodiment can be applied to all kinds of conveyance seats such as a vehicle seat, an airplane seat, and a train seat.

What is claimed is:
1. A conveyance seat comprising:
a seat cushion; and
a seat back that is connected to the seat cushion such that the seat back is tiltable, wherein
the seat cushion includes a seat pad that defines a seat outer shape, and a seat cover that covers a seating surface of the seat pad,
when an additional member is installed on a seating side of the seat cushion, an engaging portion that is columnar and protrudes from a rear surface of the additional member is moved toward the seat back while being in contact with the seat cushion, and the engaging portion is inserted between the seat cushion and the seat back, and is engaged with an engaged portion disposed between the seat cushion and the seat back, the seat pad includes a general portion configured to elastically support an occupant, and a compression portion that is compressed more easily than the general portion, the compression portion contacts and supports the seat cover, and is disposed on a movement path of the engaging portion such that the engaging portion is moved toward the engaged portion and is engaged with the engaged portion while compressing the compression portion, the compression portion is separated from the general portion by a pair of slits, each of the pair of slits being defined by a groove extending along a forward-rearward direction of the seat pad, and one of the pair of slits has a length extending along the forward-rearward direction of the seat pad that is longer than a length of the other of the pair of slits extending along the forward-rearward direction of the seat pad.

2. The conveyance seat according to claim 1, wherein the additional member is a child safety seat.

3. The conveyance seat according to claim 1, wherein:
the pair of slits extend along the movement path of the engaging portion; and
the compression portion is compressed while being expanded toward the slit portion.

4. The conveyance seat according to claim 3, wherein the compression portion is provided between the pair of the slits such that the compression portion is separated from the general portion.

5. A conveyance seat comprising:
a seat cushion; and
a seat back that is connected to the seat cushion such that the seat back is tiltable, wherein
the seat cushion includes a seat pad that defines a seat outer shape, and a seat cover that covers a seating surface of the seat pad,
when an additional member is installed on a seating side of the seat cushion, an engaging portion that is columnar and protrudes from a rear surface of the additional member is moved toward the seat back while being in contact with the seat cushion, and the engaging portion is inserted between the seat cushion and the seat back, and is engaged with an engaged portion disposed between the seat cushion and the seat back,
the seat pad includes a general portion configured to elastically support an occupant, and a compression portion that is compressed more easily than the general portion,
the compression portion contacts and supports the seat cover, and is disposed on a movement path of the engaging portion such that the engaging portion is moved toward the engaged portion and is engaged with the engaged portion while compressing the compression portion,
the compression portion is separated from the general portion by a pair of slits, each of the pair of slits being defined by a groove extending along a forward-rearward direction of the seat pad and the pair of slits extend along the movement path of the engaging portion,
when the compression portion is compressed, the compression portion expands toward the pair of slits,
the compression portion is provided between the pair of the slits such that the compression portion is separated from the general portion, and
a cord member is disposed in at least one of the pair of slits.

6. The conveyance seat according to claim 5, wherein
the cord member is disposed in one of the pair of slits, and a bottom of the other of the pair of slits is located closer to a surface of the seat pad than a position of the cord member in the one of the pair of slits.

7. The conveyance seat according to claim 6, wherein
the compression portion includes an additional slit portion, and
a bottom of the additional slit portion is provided closer to the surface of the seat pad than the position of the cord member.

8. The conveyance seat according to claim 5, wherein the cord member is a wire member.

9. The conveyance seat according to claim 3, wherein the pair of slits are open from a seating surface of the seat cushion to an end face of the seat cushion, the end face being on a side on which the seat back is disposed.

10. A conveyance seat comprising:
a seat cushion; and
a seat back that is connected to the seat cushion such that the seat back is tiltable, wherein
the seat cushion includes a seat pad that defines a seat outer shape, and a seat cover that covers a seating surface of the seat pad,
when an additional member is installed on a seating side of the seat cushion, an engaging portion that is columnar and protrudes from a rear surface of the additional member is moved toward the seat back while being in contact with the seat cushion, and the engaging portion is inserted between the seat cushion and the seat back, and is engaged with an engaged portion disposed between the seat cushion and the seat back,
the seat pad includes a general portion configured to elastically support an occupant, and a compression portion that is compressed more easily than the general portion,
the compression portion contacts and supports the seat cover, and is disposed on a movement path of the engaging portion such that the engaging portion is moved toward the engaged portion and is engaged with the engaged portion while compressing the compression portion,
the compression portion is separated from the general portion by a pair of slits, each of the pair of slits being defined by a groove extending along a forward-rearward direction of the seat pad and the pair of slits extend along the movement path of the engaging portion,
when the compression portion is compressed, the compression portion expands toward the pair of slits,
the compression portion is provided between the pair of the slits such that the compression portion is separated from the general portion, and
a bottom surface of one of the pair of slits is tilted, and a depth of the one of the pair of slits increases in a direction from a seat front side toward a seat rear side.

* * * * *